(12) United States Patent
Nagai et al.

(10) Patent No.: US 8,641,022 B2
(45) Date of Patent: Feb. 4, 2014

(54) FRONT FORK

(76) Inventors: Osamu Nagai, Shizuoka (JP); Kazuhiro Miwa, Shizuoka (JP)

( * ) Notice: Subject to any disclaimer, the term of this patent is extended or adjusted under 35 U.S.C. 154(b) by 130 days.

(21) Appl. No.: 13/428,976

(22) Filed: Mar. 23, 2012

(65) Prior Publication Data
US 2013/0048452 A1 Feb. 28, 2013

(30) Foreign Application Priority Data

Aug. 30, 2011 (JP) .................................. 2011-188010

(51) Int. Cl.
*F16F 9/48* (2006.01)
(52) U.S. Cl.
USPC .................... 267/64.15; 188/322.15; 267/226; 280/275

(58) Field of Classification Search
USPC ................... 188/282.1–282.5, 282.9, 322.15, 188/322.22; 267/64.15, 221, 226; 280/275, 280/276
See application file for complete search history.

(56) References Cited

FOREIGN PATENT DOCUMENTS

JP     2002-161940     6/2002

*Primary Examiner* — Christopher Schwartz
(74) *Attorney, Agent, or Firm* — Keith H. Orum; Orum & Roth, LLC

(57) ABSTRACT

In a front fork, a throttle flow path is provided between a hole which is provided in an inner tube and is communicated with an annular gap chamber, and a lower oil chamber in an outer periphery of a hollow pipe.

18 Claims, 12 Drawing Sheets

FRONT FORK

BACKGROUND OF THE INVENTION

1. Field of the Invention

The present invention relates to a front fork.

2. Description of the Related Art

As a front fork of a motor cycle or the like, as described in Japanese Patent Application Laid-Open (JP-A) No. 2002-161940 (patent document 1), there is a structure in which an inner tube in a vehicle body side is slidably inserted into an outer tube in a wheel side. A hollow pipe is provided with a partition wall portion coming into slidable contact with an inner periphery of the inner tube is provided in a rising manner in a bottom portion within the outer tube. An outer periphery of the hollow pipe is provided with an oil chamber in which a piston provided in an inner periphery of a leading end portion of the inner tube moves back and forth. The oil chamber is defined into an upper oil chamber above the piston and a lower oil chamber below the piston by the piston. An oil reservoir chamber running to an upper portion of the inner tube is defined in an inner periphery of the hollow pipe. An upper portion of the oil reservoir chamber is formed as an air chamber. The oil chamber in the outer periphery of the hollow pipe is communicated with the oil reservoir chamber in the inner periphery of the hollow pipe. The hollow pipe is provided with a volumetric capacity compensating flow path for compensating the oil at a volumetric capacity at which the inner tube goes into and out of the oil chamber in the outer periphery of the hollow pipe. An annular gap chamber is provided between the outer tube and the inner tube, the annular gap chamber being sandwiched by a slide guide which is fixed to the inner periphery of the outer tube and a slide guide which is fixed to the outer periphery of the inner tube, and the inner tube is provided with a hole which communicates the annular gap chamber with the oil chamber in the outer periphery of the hollow pipe. The annular gap chamber between the outer tube and the inner tube can lubricate the slide guides of the outer tube and the inner tube by the oil which is charged from the oil chamber in the outer periphery of the hollow pipe.

In the front fork described in JP-A No. 2002-161940, in a compression stroke, when the piston of the inner tube goes into the oil chamber in the outer periphery of the hollow pipe, the pressure in the lower oil chamber rises, and opens a check valve provided in the piston so as to substitute the oil in the lower oil chamber with the side of the upper oil chamber. In conjunction with this, when the oil at an amount of cross sectional area of the inner tube×stroke moves to the oil reservoir chamber from the lower oil chamber through the hole of the hollow pipe, it generates a damping force caused by a passage resistance generated in the hole.

Further, in an extension stroke, when the piston of the inner tube goes out of the oil chamber in the outer periphery of the hollow pipe, the pressure in the upper oil chamber rises so that the oil in the upper oil chamber moves to the lower oil chamber from a throttle flow path which the check valve provided in the piston forms, and then, a damping force caused by a passage resistance generated in the throttle flow path, is generated. At the same time, the oil at the amount of cross sectional area of the inner tube×stroke is replenished to the lower oil chamber from the oil reservoir chamber through the hole of the hollow pipe.

In this case, when the inner tube extends and retracts with respect to the outer tube, the annular gap chamber between the outer tube and the inner tube extends and retracts. In accordance with this, the oil in the oil chamber in the outer periphery of the hollow pipe is pressure filled in the annular gap chamber which is expanded in the compression stroke. Further, the oil in the annular gap chamber which retracts in the extension stroke is discharged to the oil chamber in the outer periphery of the hollow pipe.

In the front fork described in JP-A No. 2002-161940, an air reservoir is generated in an upper space within the annular gap chamber, in an assembly stage of setting a sub assembly in which the inner tube is inserted into the outer tube, injecting a working fluid from an upper end opening portion of the inner tube, and filling the oil in the oil chamber in the outer periphery of the hollow pipe, the oil reservoir chamber in the inner periphery of the hollow pipe, and the annular gap chamber between the outer tube and the inner tube. The air reservoir is hard to be bled, and stays after assembling the front fork.

Accordingly, when the pressure in the lower oil chamber in the outer periphery of the hollow pipe rises in the compression stroke of the front fork, and the pressure in the lower oil chamber is applied to the annular gap chamber between the outer tube and the inner tube, the air staying in the annular gap chamber is compressed. It is then impossible to generate a stable compression side damping force, and a response delay is caused in the generation of the damping force.

Further, in the case that the compression side damping force mentioned above is set higher, the high pressure in the lower oil chamber is directly applied to the seal member in the annular gap chamber, and there is a risk that oil leakage is induced. Accordingly, it is necessary to raise a pressure resistance of the seal member. The rise of the compression side damping force is decided on the basis of the pressure resistance of the seal member.

SUMMARY OF THE INVENTION

An object of the present invention is to improve a response of generation of a damping force, and improve a sealing performance of an annular gap chamber between an outer tube and an inner tube, in a front fork.

In one embodiment of the present invention, there is provided a front fork comprising an inner tube in a vehicle body side being slidably inserted into an outer tube in a wheel side. A hollow pipe has a partition wall portion coming into slidable contact with an inner periphery of the inner tube being provided in a rising manner in a bottom portion within the outer tube. An oil chamber in which a piston provided in an inner periphery of a leading end portion of the inner tube moves back and forth is provided in an outer periphery of the hollow pipe, and the oil chamber being comparted into an upper oil chamber above the piston and a lower oil chamber below the piston by the piston. An oil reservoir chamber runs into an upper portion of the inner tube being defined in an inner periphery of the hollow pipe, and an upper portion of the oil reservoir chamber is formed as an air chamber. The oil chamber in the outer periphery of the hollow pipe is communicated with the oil reservoir chamber in the inner periphery of the hollow pipe, the hollow pipe being provided with a volumetric capacity compensating flow path for compensating oil at a volumetric capacity at which the inner tube goes into and out of the oil chamber in the outer periphery of the hollow pipe. An annular gap chamber is sandwiched by a slide guide fixed to an inner periphery of the outer tube and a slide guide fixed to an outer periphery of the inner tube, the annular gap chamber being provided between the outer tube and the inner tube, and the inner tube being provided with a hole which communicates the annular gap chamber with the oil chamber in the outer periphery of the hollow pipe. A throttle flow path is provided between a hole which is provided in the inner tube and is communicated with the annular gap chamber, and a lower oil chamber in the outer periphery of the hollow pipe.

In one embodiment of the present invention, there is provided a front fork, wherein a check valve which allows an inflow of the oil to the upper oil chamber in a compression stroke and narrows down the oil flowing out of the upper oil chamber in an extension stroke is provided between the hole which is provided in the inner tube and is communicated with the annular gap chamber, and the upper oil chamber in the outer periphery of the hollow pipe.

In another embodiment of the present invention, there is provided the front fork, wherein the check valve is provided in the piston.

In another embodiment of the present invention, there is provided the front fork, wherein the throttle flow path is provided in the piston.

In another embodiment of the present invention, there is provided the front fork, wherein a check valve which allows an inflow of the oil to the lower oil chamber in an extension stroke and narrows down the oil flowing out of the lower oil chamber in a compression stroke is provided between the hole which is provided in the inner tube and is communicated with the annular gap chamber, and the lower oil chamber in the outer periphery of the hollow pipe, and the check valve forms the throttle flow path.

According to another embodiment of the present invention, there is provided the front fork, wherein the throttle flow path of the check valve is constructed by a throttle flow path having a fixed opening degree.

In another embodiment of the present invention, there is provided the front fork, wherein the throttle flow path of the check valve is constructed by a throttle flow path in which an opening degree is changed by opening and closing a disc valve.

In another embodiment of the present invention, there is provided the front fork, wherein the check valve is provided in the piston.

In another embodiment of the present invention, the front fork has an outer periphery of the partition wall portion provided in the hollow pipe is provided with a check valve which allows an inflow of the oil form the oil reservoir chamber in the upper portion of the partition wall portion to the oil chamber in the outer periphery of the hollow pipe in the compression stroke, and inhibits an outflow of the oil from the oil chamber in the outer periphery of the hollow pipe to the oil reservoir chamber in the upper portion of the partition wall portion in the extension stroke.

In another embodiment of the present invention, the front fork has a volumetric capacity compensating flow path for compensating the oil at a volumetric capacity in which the inner tube goes into and out of the oil chamber in the outer periphery of the hollow pipe is formed in the hollow pipe. The volumetric capacity compensating flow path is provided with an annular check valve which is attached to the outer periphery of the hollow pipe. The annular check valve forms an annular flow path which allows the oil at a going-out volume of the inner tube to be replenished to the oil chamber from the oil reservoir chamber via the volumetric capacity compensating flow path in the extension stroke, and narrows down the oil at an inserting volume of the inner tube discharged to the oil reservoir chamber from the oil chamber via the volumetric capacity compensating flow path in the compression stroke, with respect to the outer periphery of the hollow pipe.

According to another embodiment of the present invention, the front fork has a compression side damping force adjusting means provided in the flow path which discharges the oil at the volumetric capacity at which the inner tube goes into the oil chamber in the outer periphery of the hollow pipe in the compression stroke from the oil chamber to the oil reservoir chamber.

In accordance with one embodiment, the following operations and effects can be achieved.

(a) In the front fork, the throttle flow path is provided between the hole which is provided in the inner tube and is communicated with the annular gap chamber, and the lower oil chamber in the outer periphery of the hollow pipe. In accordance with this, the lower oil chamber and the annular gap chamber are separated by the throttle flow path. In other words, it is possible to inhibit the pressure of the lower oil chamber from being applied to the annular gap chamber even if the pressure in the lower oil chamber rises in the compression stroke, on the basis of the existence of the throttle flow path. Accordingly, it is possible to avoid the compression of the air staying in the annular gap chamber during the compression stroke so as to generate a stable compression side damping force, and a response delay is not generated in the generation of the compression side damping force.

Further, even in the case that the compression side damping force mentioned above is set high, the throttle flow path inhibits the high pressure in the lower oil chamber from being applied to the seal member in the annular gap chamber. In accordance with this, it is possible to prevent oil leakage without raising a pressure resistance of the seal member, and it is possible to improve a sealing performance for the annular gap chamber.

(b) It is possible to allow the inflow of the oil to the upper oil chamber in the compression stroke, by the check valve provided between the hole which is provided in the inner tube and is communicated with the annular gap chamber, and the upper oil chamber in the outer periphery of the hollow pipe, whereby it is possible to narrow down the oil which flows out of the upper oil chamber in the extension stroke.

(c) On the basis of the provision of the check valve in the item (b) mentioned above in the piston, it is possible to achieve a simplification and a downsizing of the structure.

(d) On the basis of the provision of the throttle flow path in the item (a) mentioned above in the piston, it is possible to achieve a simplification and a downsizing of the structure.

(e) The throttle flow path in the item (a) mentioned above has the following disadvantages in the case that it not only narrows down the oil flowing out of the lower oil chamber in the compression stroke, but also narrows down the oil which is going to flow into the lower oil chamber. In other words, since the throttle flow path in the item (a) mentioned above suppresses the movement of the pressurized oil in the upper oil chamber to the lower oil chamber in the extension stroke, the oil pressurized in the upper oil chamber applies to the annular gap chamber from the hole of the inner tube, and compresses the air which stays in the annular gap chamber. In accordance with this, it is impossible to generate a stable extension side damping force, and a response delay is generated in the generation of the damping force. Further, in the case that the extension side damping force mentioned above is set high, the high pressure of the upper oil chamber is directly applied to the seal member of the annular gap chamber, and there is a risk that an oil leakage is induced. Therefore, it is necessary to increase the pressure resistance of the seal member. An upper limit of the extension side damping force is decided by the pressure resistance of the seal member.

On the contrary, the check valve which allows the inflow of the oil to the lower oil chamber in the extension stroke, and narrows down the oil flowing out of the lower oil chamber in the compression stroke, is provided between the hole which is provided in the inner tube and is communicated with the annular gap chamber, and the lower oil chamber in the outer periphery of the hollow pipe. The throttle flow path substituting for the throttle flow path in the item (a) mentioned above is formed by the check valve. In accordance with this, the throttle flow path of the check valve serves as the throttle flow path in the item (a) mentioned above in the compression stroke, thereby improving the response of the compression side damping force as mentioned above (a), and even in the case that the compression side damping force is set high, it is possible to improve the sealing performance of the annular gap chamber.

Further, since it is possible to allow the pressurized oil in the upper oil chamber to immediately flow to the lower oil chamber in the extension stroke, by this check valve, the oil pressurized in the upper oil chamber does not apply to the annular gap chamber from the hole of the inner tube and does not compress the air which stays in the annular gap chamber. In accordance with this, it is possible to improve the response as well as stabilizing the generation of the extension side damping force. Further, since the high pressure in the upper oil chamber does not apply to the seal member in the annular gap chamber, the upper limit of the extension side damping force is not decided by the pressure resistance of the seal member, and it is possible to improve the sealing performance of the annular gap chamber.

(f) Since the throttle flow path of the check valve in the item (e) mentioned above consists of the throttle flow path having the fixed opening degree, it is possible to simplify the check valve.

(g) Since the throttle flow path of the check valve in the item (e) mentioned above consists of a throttle flow path which changes an opening degree on the basis of an opening and closing of the disc valve, a setting and adjusting width of the compression side damping force characteristic in the compression stroke in the item (a) mentioned above becomes large.

(h) Since the check valve 110 in the items (e) to (g) mentioned above is provided in the piston, it is possible to achieve the simplification and the downsizing of the structure.

(i) An outer periphery of the partition wall portion provided in the hollow pipe is provided with the check valve which allows an inflow of the oil to the oil chamber in the outer periphery of the hollow pipe from the oil reservoir chamber in the upper portion of the partition wall portion in the compression stroke, and inhibits an outflow of the oil to the oil reservoir chamber in the upper portion of the partition wall portion from the oil chamber in the outer periphery of the hollow pipe in the extension stroke. In accordance with this, it is possible to promote the oil supply to the upper oil chamber from the oil reservoir chamber in the upper portion and prevent the upper oil chamber from coming to a negative pressure, in the compression stroke, whereby it is possible to prevent a pause of the extension side damping force from being generated at a time of being inverted to the extension stroke.

(j) A volumetric capacity compensating flow path for compensating the oil at a volumetric capacity at which the inner tube goes into and out of the oil chamber in the outer periphery of the hollow pipe is formed in the hollow pipe, and the annular check valve which is attached to an outer periphery of the hollow pipe is provided in the volumetric capacity compensating flow path. Further, the annular check valve allows the oil at a going-out volume of the inner tube in the extension stroke to be compensated to the oil chamber from the oil reservoir chamber via the volumetric capacity compensating flow path. An annular flow path narrowing down the oil at an inserting volume of the inner tube which is discharged to the oil reservoir chamber from the oil chamber via the volumetric capacity compensating flow path in the compression stroke is formed with respect to the outer periphery of the hollow pipe.

The annular flow path of the annular check valve applies a damping characteristic of a direct proportional characteristic (a viscous resistance type) to the oil which is discharged to the oil reservoir chamber from the lower oil chamber via the volumetric capacity compensating flow path, in the compression stroke. If the flow path which is discharged to the oil reservoir chamber from the lower oil chamber via the volumetric capacity compensating flow path is constructed by a round hole which is pierced in the hollow pipe, the damping characteristic comes to a square hole characteristic.

In the extension stroke, it is possible to promote the oil supply to the lower oil chamfer from the oil reservoir chamber, prevent the lower oil chamber from coming to a negative pressure, and prevent the pause of the compression side damping force from being generated at a time of inverting to the compression stroke.

(k) The compression side damping force can be finely adjusted by setting the compression side damping force adjusting means in the flow path which discharges the oil at a volumetric capacity at which the inner tube goes into the oil chamber in the outer periphery of the hollow pipe in the compression stroke from the oil chamber to the oil reservoir chamber.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Embodiment 1

FIG. 1 to FIG. 8

Figure 1:
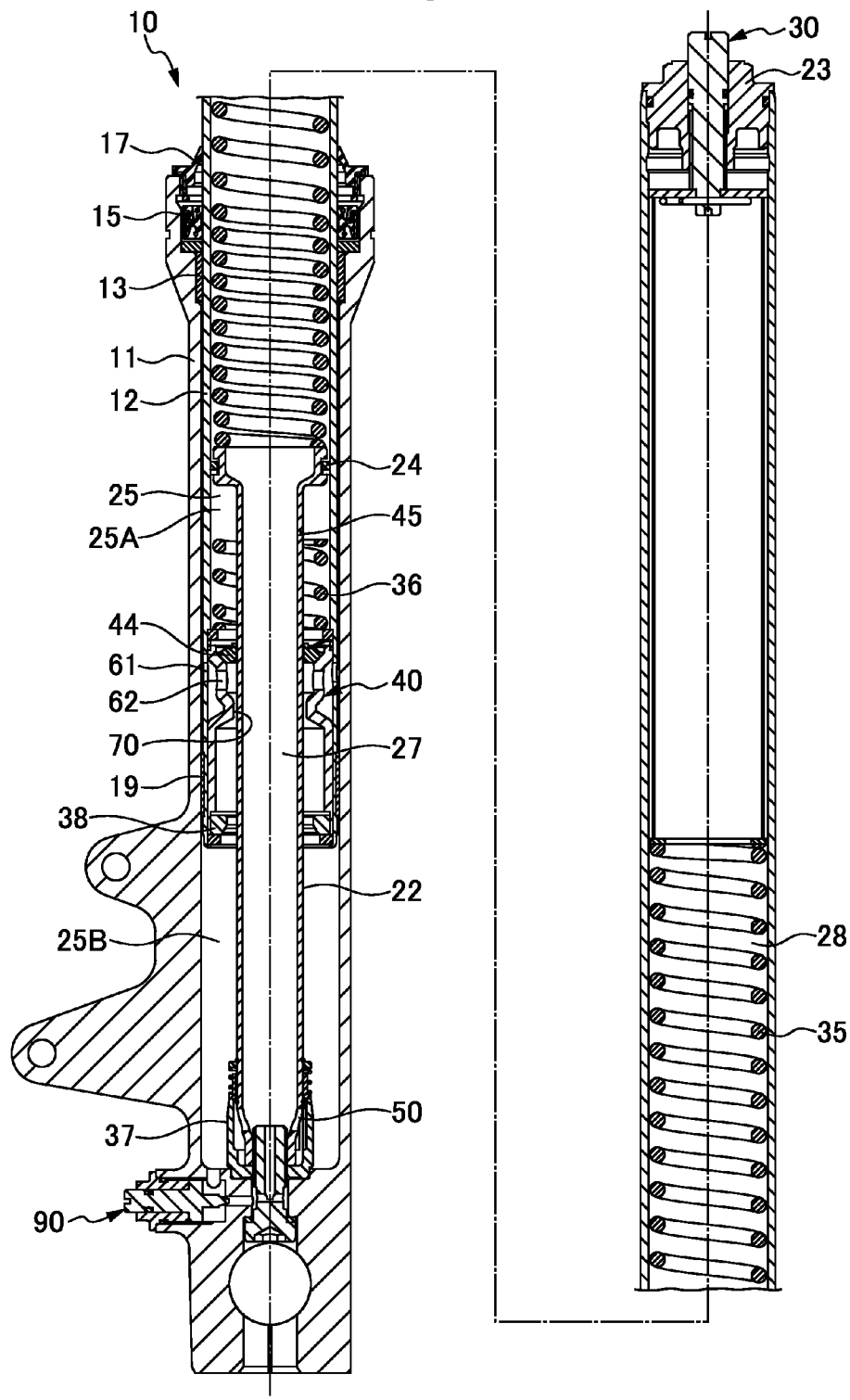
FIG. 1 is a cross sectional view of a whole and shows a front fork in accordance with an embodiment 1.

A front fork 10 (a hydraulic shock absorber) is used in a motor cycle or the like. It is structured, as shown in FIG. 1 to FIG. 4, such that an inner tube 12 (a vehicle body side tube) in a vehicle body side is slidably inserted into an outer tube 11 (a wheel side tube) in which one end is closed and another end is open, in a wheel side. An opening end into which the inner tube 12 is inserted in the outer tube 11 is provided with a slide guide 13, a seal spacer 14, an oil seal 15, a stopper ring 16 and a dust seal 17. A slide guide 19 is provided in an outer peripheral portion of a lower end which is inserted into the outer tube 11 in the inner tube 12.

A bolt 21 is inserted into a bottom portion of the outer tube 11 via a copper packing 21A, and a hollow pipe 22 which is fixed by the bolt 21 is provided in a rising manner. The bolt 21 is attached by screw to a thread portion in an inner periphery of a contracted portion below a lower end taper portion of the hollow pipe 22. An outer periphery of a lower end portion of a cap bolt 23 is attached by screw to an upper end portion of the inner tube 12 via an O-ring 23A, and a spring load adjusting means 30 is provided in a center portion of the cap bolt 23.

The spring load adjusting means 30 has an adjust bolt 31 which is attached by screw as well as being passed through inner and outer sides of a center portion of the cap bolt 23 via an O-ring 31A. A tabular upper spring receiving portion 32 is fixed to an end portion which is inserted into an inner portion of the inner tube 12 while passing through the cap bolt 23 in the adjust bolt 31, and a spring receiving collar 33 is supported in a contact manner to a lower surface of the upper spring receiving portion 32. A compression coil spring 35 is interposed between the upper spring receiving portion 32 and the spring receiving collar 33, and a lower spring receiving portion 34 which consists of an upper end surface of an expanded partition wall portion 22A provided in an upper end portion of the hollow pipe 22. An initial load of the compression coil spring 35 is adjusted and set on the basis of a screw motion of the adjust bolt 31.

The partition wall portion 22A mentioned above is provided in an upper end portion of the hollow pipe 22, and a check valve 24 which comes into slidable contact with an inner periphery of the inner tube 12 is fitted and inserted into an annular groove 22B in an outer periphery of the partition wall portion 22A. An oil chamber 25 mentioned below is provided in an outer periphery of a lower portion of the partition wall portion 22A in the hollow pipe 22.

The check valve 24 consists of a C-shaped piston ring which is loaded to the annular groove 22B in the outer periphery of the partition wall portion 22A of the hollow pipe 22 so as to be movable up and down, comes into slidable contact with the inner periphery of the inner tube 12, and forms an annular flow path 26 with respect to a groove bottom portion of the annular groove 22B. The check valve 24 forms and is provided with a notch portion 24A passing through in a diametrical direction in a lower end surface which is closer to the oil chamber 25 within the annular groove 22B of the partition wall portion 22A. In accordance with this, the check valve 24 moves downward (moves downward in conjunction with a relative downward movement of the inner tube 12 with respect to the hollow pipe 22) in the compression stroke, forms a gap between an upper end surface of the check valve 24 and an upper wall portion of the annular groove 22B of the partition wall portion 22A, and allows oil in an oil reservoir chamber 27 mentioned below above the partition wall portion 22A to flow into the oil chamber 25 (an upper oil chamber 25A) in an outer periphery of the hollow pipe 22 via the annular flow path 26 and the notch portion 24A. On the other hand, the check valve 24 moves upward (moves upward in conjunction with a high pressure formation of the upper oil chamber 25A and a relative upward movement of the inner tube 12 with respect to the hollow pipe 22) in the extension stroke, brings the upper end surface of the check valve 24 into close contact with the upper wall portion of the annular groove 22B of the partition wall portion 22A so as to close the valve, and inhibits oil from flowing out of the oil chamber 25 (the upper oil chamber 25A) in the outer periphery of the hollow pipe 22 to the oil reservoir chamber 27 in the upper portion of the partition wall portion 22A.

A piston 40 is provided in an inner periphery of a leading end portion (a lower end portion) which is inserted into the outer tube 11 in the inner tube 12. The piston 40 consists of an annular upper piece 41 which is locked to an inner diameter step portion of the inner tube 12, a tubular lower piece 42 which is fixed to the upper piece 41 by a lower end caulking portion 12A of the inner tube 12, and a washer 43. A check valve 44 is arranged in an inner periphery of the upper taper portion 42A of the lower piece 42. The check valve 44 will be mentioned later.

The piston 40 in the leading end portion of the inner tube 12 goes into and out of the oil chamber 25 in the outer periphery of the hollow pipe 22, and divides the oil chamber 25 into upper and lower parts. In other words, the upper oil chamber 25A is formed by the inner tube 12, the hollow pipe 22, the partition wall portion 22A and the piston 40, and the lower oil chamber 25B is formed by the outer tube 11 in the lower portion of the piston 40 and the hollow pipe 22.

The oil reservoir chamber 27 running into the upper portion of the inner tube 12 is comparted in the inner periphery of the hollow pipe 22. The working fluid is filled in the oil reservoir chamber 27, and an upper portion of the oil reservoir chamber 27 is formed as an air chamber 28. Further, the hollow pipe 22 is provided with a volumetric capacity compensating flow path 50 which communicates the oil chamber 25 in the outer periphery of the hollow pipe 22 with the oil reservoir chamber 27 in the inner periphery of the hollow pipe 22 and is set for compensating the oil at the volumetric capacity at which the inner tube 12 goes into and out of the oil chamber 25 in the outer periphery of the hollow pipe 22. The volumetric capacity compensating flow path 50 will be mentioned later.

Between the outer tube 11 and the inner tube 12, there is provided an annular gap chamber 60 sandwiched between a slide guide 13 which is fixed to an inner periphery of the outer tube 11, and a slide guide 19 which is fixed to an outer periphery of the inner tube 12. At least one hole 61 is pierced in a portion in which the piston 40 is provided in the inner tube 12. At least one hole 62 is pierced in a lower piece 42 of the piston 40, and the annular gap chamber 60 is communicated with the oil chamber 25 (the upper oil chamber 25A and the lower oil chamber 25B) in the outer periphery of the hollow pipe 22 by these holes 61 and 62. In accordance with this, the working fluid is supplied to the annular gap chamber 60, and lubrication and volumetric capacity compensation of the slide guides 13 and 19 are carried out.

In this case, the check valve 44 provided in the piston 40 mentioned above is provided between the hole 61 of the inner tube 12 and the hole 62 of the lower piece 42 of the piston 40 which are communicated with the annular gap chamber 60, and the upper oil chamber 25A in the outer periphery of the hollow pipe 22. The check valve 44 is energized by a spring 44A formed as a disc spring (may be formed as a coil) which is supported its back face by the upper piece 41. A taper surface thereof is seated on a taper surface of the upper taper portion 42A of the lower piece 42, and an annular gap 44B is formed between an inner periphery thereof and an outer periphery of the hollow pipe 22. In accordance with this, the check valve 44 is opened on the basis of a hydraulic pressure of the lower oil chamber 25B which comes to a high pressure, and allows the oil to flow into the upper oil chamber 25A from the lower oil chamber 25B, in the compression stroke. On the other hand, the check valve 44 seats on the upper taper portion 42A of the lower piece 42 on the basis of a hydraulic pressure of the upper oil chamber 25A which comes to a high pressure, and narrows down the oil flowing out of the upper oil chamber 25A by the annular gap 44B, in the extension stroke.

The hollow pipe 22 is provided in a piercing manner just below the partition wall portion 22A with an orifice 45 which makes a part of the oil in the upper oil chamber 25A coming to a high pressure in the extension stroke flow out to the oil reservoir chamber 27 in the inner periphery of the hollow pipe 22.

In this case, a rebound spring 36 at a time of a maximum extension which corresponds to a stroke end in the extension stroke is provided between the upper piece 41 of the piston 40 which is provided in the inner tube 12, and the partition wall portion 22A which is provided in the hollow pipe 22, and controls a maximum extension stroke. Further, an oil lock piece 37 is pinched between a lower end portion of the hollow pipe 22 and a bottom portion of the outer tube 11. A maximum compression stroke is controlled by pressurizing the working fluid in the periphery of the oil lock piece 37 by an oil lock collar 38 which is provided in a lower end inner periphery of the lower piece 42 of the piston 40 at a time of a maximum compression which corresponds to a stroke end of the compression stroke.

The oil lock collar 38 mentioned above interposing a micro gap with respect to the inner periphery of the lower piece 42 is fitted between the lower piece 42 of the piston 40 and the washer 43 so as to be movable up and down. The oil lock collar 38 is fitted via a micro gap with respect to the oil lock piece 37 provided in the side of the hollow pipe 22, in the vicinity of the maximum compression of the front fork 10, and buffers at a time of the minimum compression. Further, at a time of the extension from the maximum compression state, it moves downward so as to open an oil path consisting of a micro gap in an outer periphery of the oil lock collar 38.

Accordingly, the front fork 10 is provided with the following structures for improving a response of generation of the damping force, and improving a sealing performance of the annular gap chamber 60 between the outer tube 11 and the inner tube 12.

The front fork 10 is provided with a throttle flow path 70 which narrows down the oil flowing out of the lower oil chamber 25B in a whole region from a stroke initial time of the compression stroke to a stroke end, and inhibits the pressure in the lower oil chamber 25B from applying to the annular gap chamber 60, between the hole 61 of the inner tube 12 which is communicated with the annular gap chamber 60, and the hole 62 of the lower piece 42 of the piston 40, and the lower oil chamber 25B in the outer periphery of the hollow pipe 22. The throttle flow path 70 in accordance with the present embodiment is provided in an intermediate portion (a portion coming closer to the lower oil chamber 25B than the hole 62) of the lower piece 42 of the piston 40, and is constructed by a contracted portion 71 obtained by reducing an inner diameter of the intermediate portion of the lower piece 42. An annular gap flow path which the reduced inner diameter of the contracted portion 71 forms with respect to the outer periphery of the hollow pipe 22 comes to the throttle flow path 70.

Further, the front fork 10 is provided with the volumetric capacity compensating flow path 50 which communicates the oil chamber 25 and the oil reservoir chamber 27. The volumetric capacity compensating flow path 50 is set for compensating the oil at the volumetric capacity at which the inner tube 12 goes into and out of the oil chamber 25 in the outer periphery of the hollow pipe 22, in the lower end portion of the hollow pipe 22 which is provided in a rising manner by the bolt 21 in the bottom portion of the outer tube 11, and the oil lock piece 37. In other words, the volumetric capacity compensating flow path 50 consists of holes 51 and a plurality of grooves 52. The holes 51 are pierced at a plurality of positions in a peripheral direction of the lower end taper portion of the hollow pipe 22 surrounded by the oil lock piece 37 when the lower end taper portion of the hollow pipe 22 is fitted to the upper end inner diameter portion of the oil lock piece 37. The plurality of grooves 52 are formed at a plurality of positions in a peripheral direction of an upper end inner diameter portion of the oil lock piece 37 to which the lower end taper portion of the hollow pipe 22 is fitted.

Figure 8:
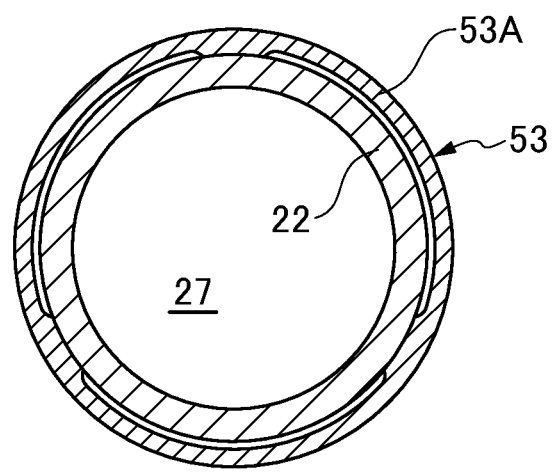
FIG. 8 is a cross sectional view along a line VIII-VIII in FIG. 7.

In the present embodiment, the volumetric capacity compensating flow path 50 is provided further with an annular check valve 53 which is attached to an outer periphery of the hollow pipe 22. The annular check valve 53 forms an annular flow path 53A which is along a peripheral direction of an inner diameter of an annular body with respect to the outer periphery of the hollow pipe 22 (FIG. 8). In the present embodiment, the annular check valve 53 forms three circular arc shaped annular flow paths 53A which are adjacent to each other in the peripheral direction. The annular check valve 53 can switch to a valve close state in which a washer 55 locked to a stop ring 54 provided in the outer periphery of the hollow pipe 22 elastically comes into contact with an upper end surface of the oil lock piece 37 by a backup valve spring 56, and to a valve open state in which it is isolated from the upper end surface of the oil lock piece 37 on the basis of a negative pressure of the lower oil chamber 25B. Reference numeral 57 denotes a come-off preventing stop ring of the annular check valve 53 or the like which is embedded in the hollow pipe 22. In accordance with this, the annular check valve 53 is opened in the extension stroke so as to allow the oil at the going-out volume of the inner tube 12 to be replenished to the lower oil chamber 25B from the oil reservoir chamber 27 via the volumetric capacity compensating flow path 50 (the hole 51 and the groove 52). Further, the annular check valve 53 is closed in the compression stroke so as to narrow down the oil at the inserting volume of the inner tube 12 by the annular flow path 53A, and discharge to the oil reservoir chamber 27 from the lower oil chamber 25B via the volumetric capacity compensating flow path 50 (the hole 51 and the groove 52).

Further, the front fork 10 is provided with a compression side damping force adjusting means 90 in a bypass flow path 80 which communicates the oil chamber 25 and the oil reservoir chamber 27 while bypassing the volumetric capacity compensating flow path 50. The bypass flow path 80 discharges the oil at the volumetric capacity at which the inner tube 12 goes into the oil chamber 25 in the compression stroke from the lower oil chamber 25B to the oil reservoir chamber 27. In other words, the bypass flow path 80 is constructed by a hole-like flow path 81 which is pierced in the lower portion of the outer tube 11, and a hole-like flow path 82 which is pierced in the bolt 21. The compression side damping force adjusting means 90 narrows down the oil which is discharged to the oil reservoir chamber 27 from the lower oil chamber 25B in the compression stroke and finely adjusts the compression side damping force, by making a needle 92 which is installed to a cap 91 attached by screw to the lower portion of the outer tube 11 go into and out of the hole-like flow path 81 of the outer tube 11, and adjusting so as to narrow down a flow path area of the hole-like flow path 81.

In the front fork 10, a shock exposed to the vehicle is absorbed and reduced by the compression coil spring 35 and the air spring of the air chamber 28, and a vibration of the compression coil spring 35 in conjunction with the absorption of the shock is damped on the basis of the following damping action.

Figure 2:
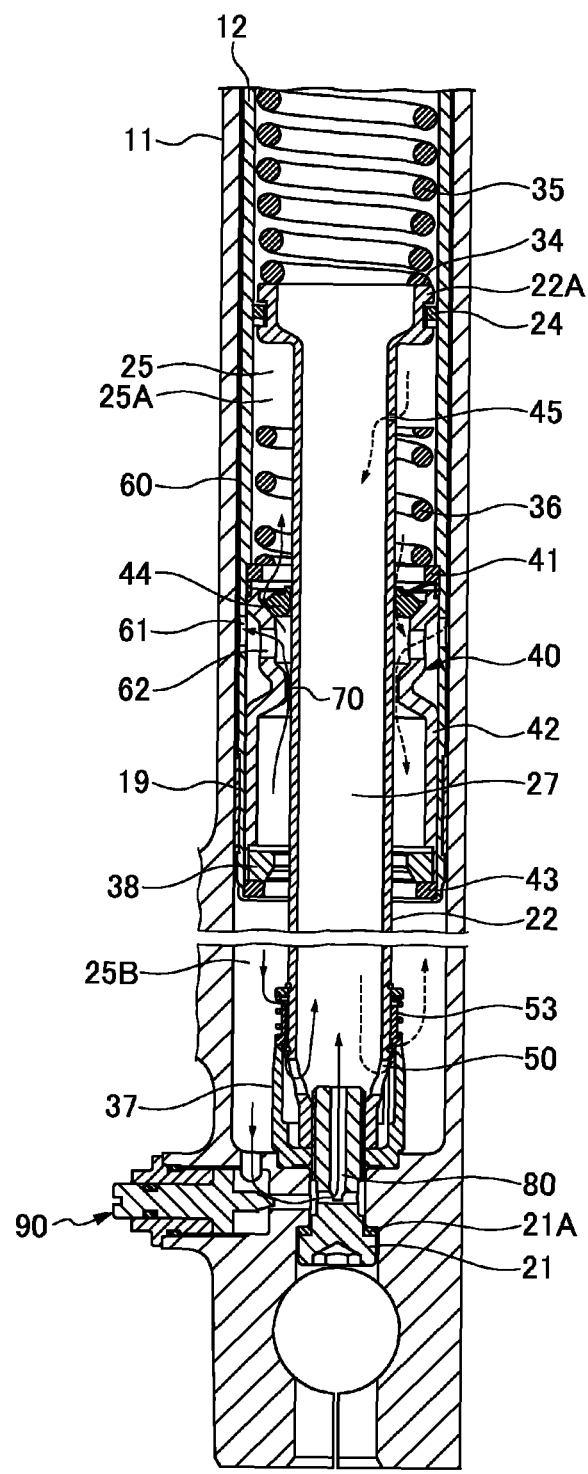
FIG. 2 is a cross sectional view of a lower portion in FIG. 1.
Figure 3:
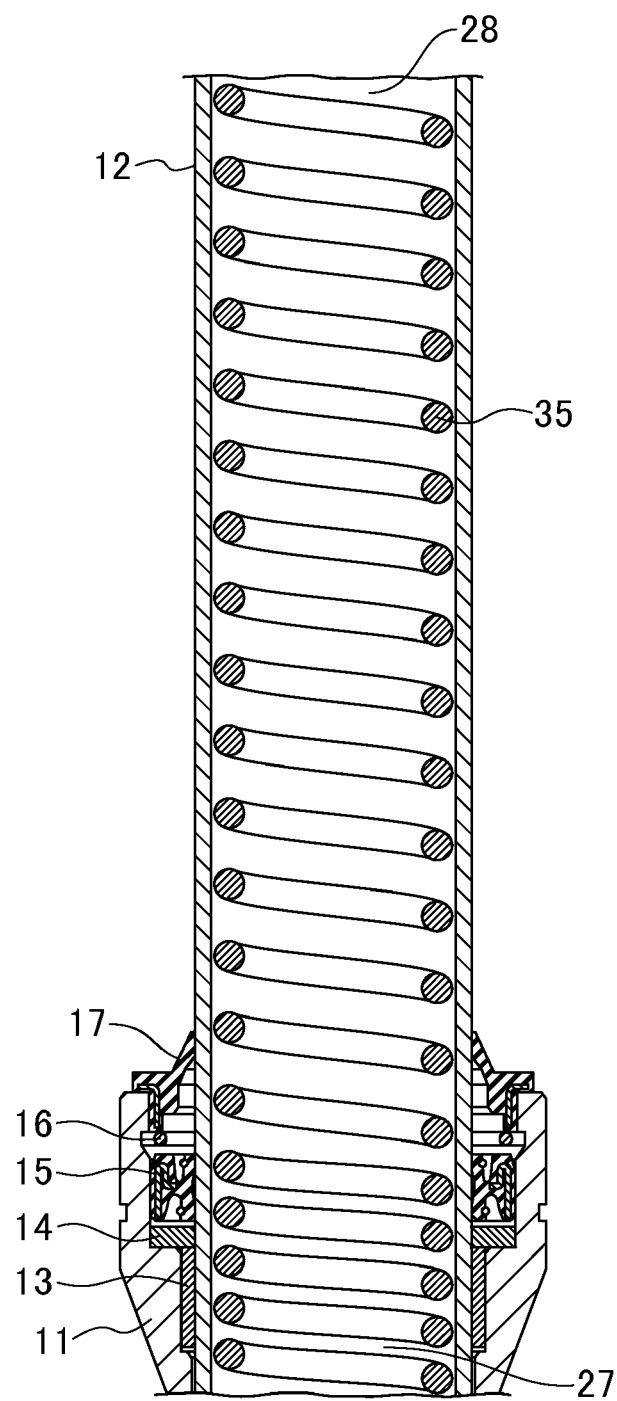
FIG. 3 is a cross sectional view of an intermediate portion in FIG. 1.
Figure 4:
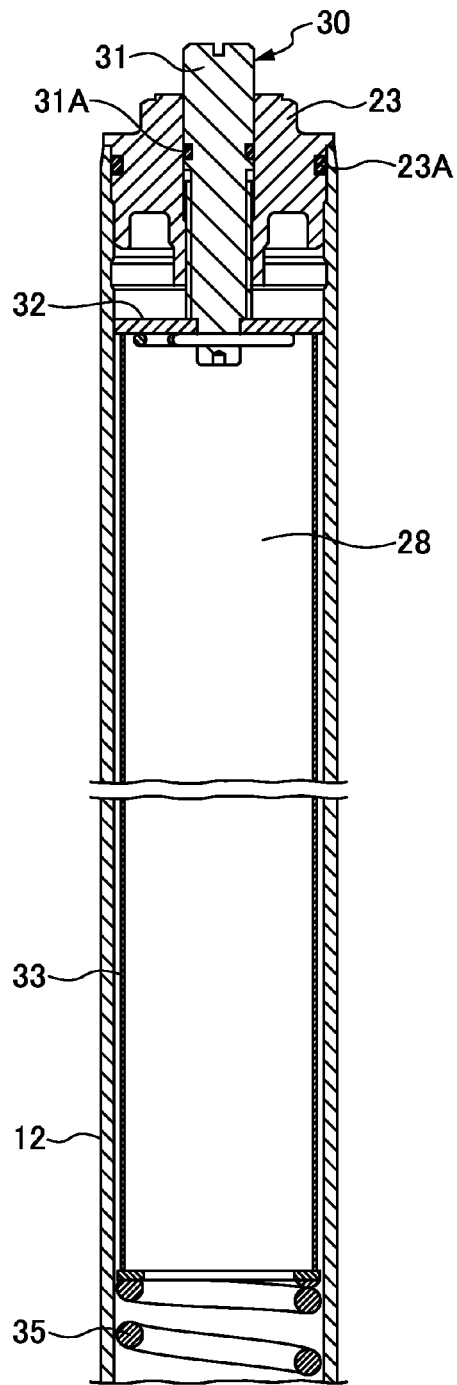
FIG. 4 is a cross sectional view of an upper portion in FIG. 1.
Figure 5:
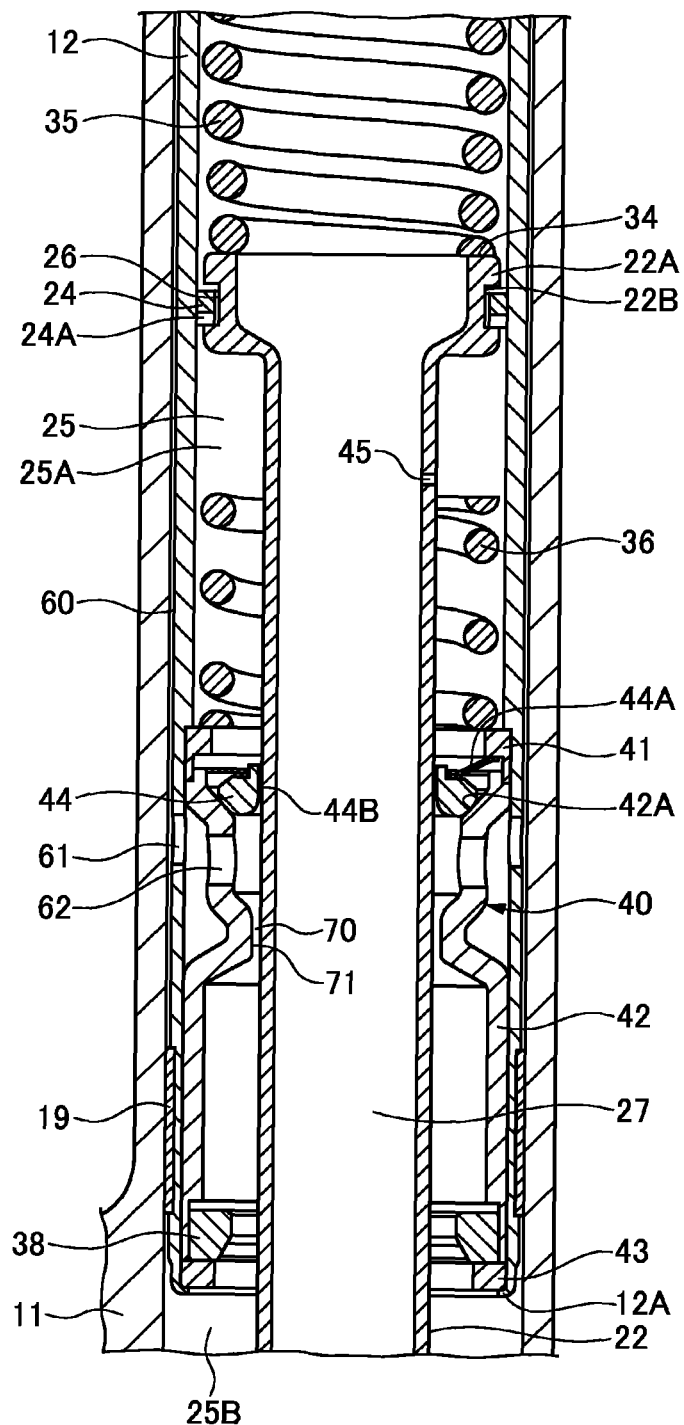
FIG. 5 is a cross sectional view showing a hollow pipe and a piston.
Figure 6:
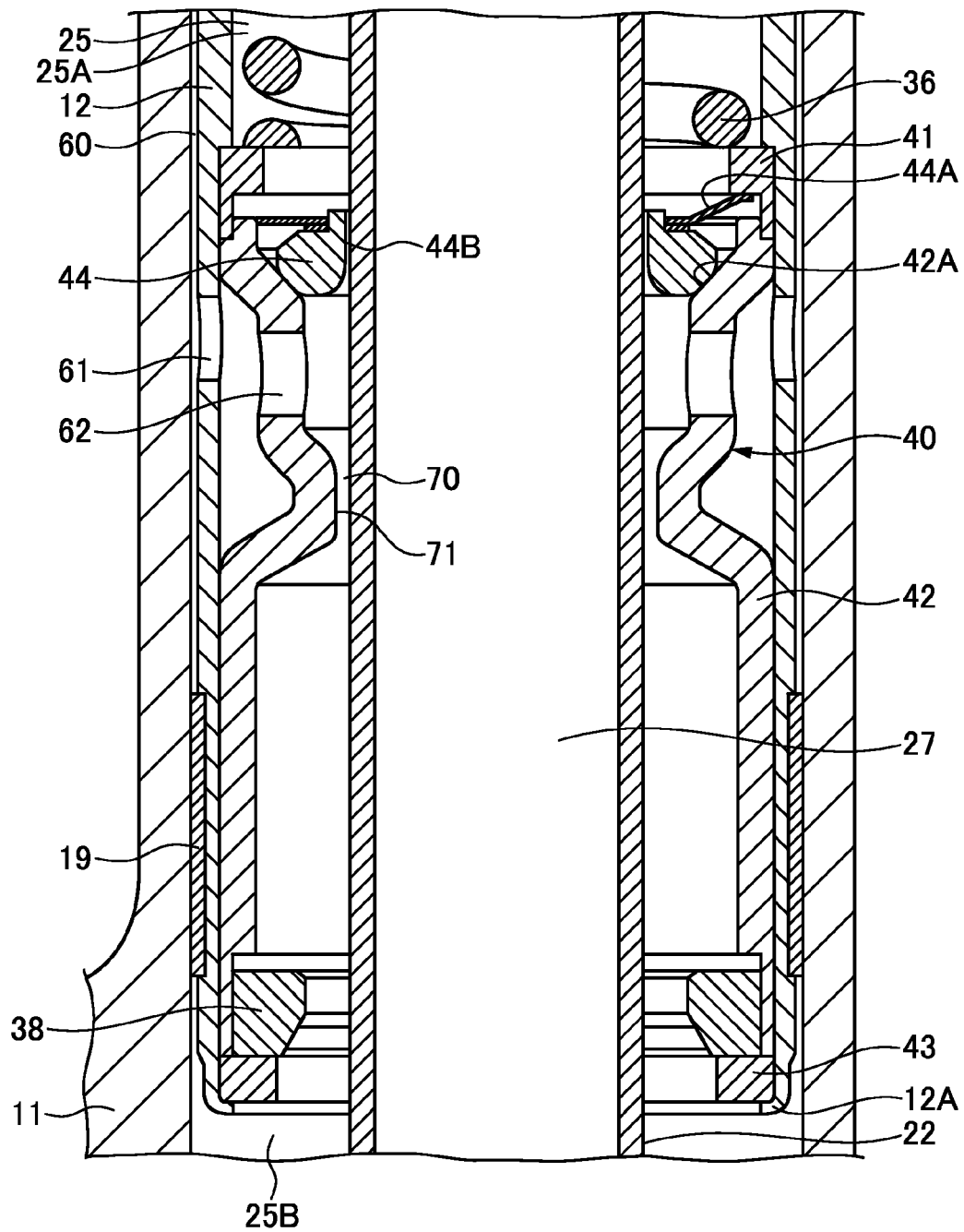
FIG. 6 is an enlarged cross sectional view showing the piston.
Figure 7:
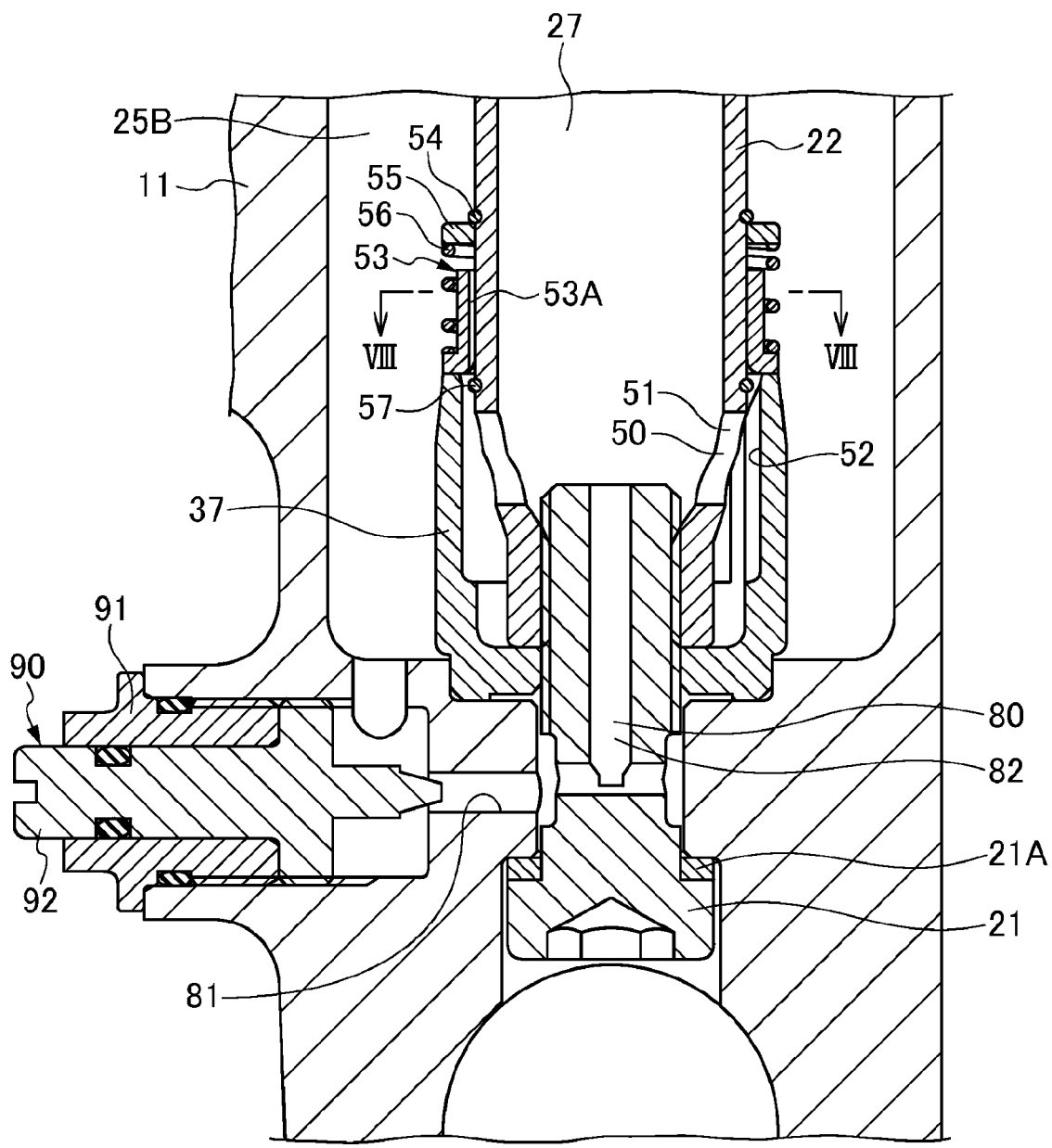
FIG. 7 is an enlarged cross sectional view showing a compression side damping force adjusting means.

(Compression Stroke) (Solid Line in FIG. 2)

In the compression stroke of the front fork 10, the inner tube 12 moves down from the extended state. The pressure in the lower oil chamber 25B is increased, and the check valve 44 of the piston 40 moves upward so as to be opened. The oil in the lower oil chamber 25B is substituted with the side of the upper oil chamber 25A. The damping force caused by the passage resistance generated in the annular flow path 53A or the passage resistance generated in the hole-like flow path 81 which is narrowed down by the compression side damping force adjusting means 90, is generated, at a time when the oil at the cross sectional area×stroke of the inner tube 12 moves to the annular flow path 53A of the annular check valve 53 which is provided in the volumetric capacity compensating flow path 50 from the lower oil chamber 25B, or to the oil reservoir chamber 27 through the bypass flow path 80 of the volumetric capacity compensating flow path 50.

Further, in this compression stroke, the oil in the oil chamber 25 is replenished to the annular gap chamber 60 between the outer tube 11 and the inner tube 12, which is expanded by the downward movement of the inner tube 12, from the hole 61 of the inner tube 12 and the hole 62 of the piston 40.

(Extension Stroke) (Broken Line in FIG. 2)

In the extension stroke of the front fork 10, the inner tube 12 moves up from the compressed state, and the pressure of the upper oil chamber 25A is increased. There is generated a damping force caused by the passage resistance which is generated in the annular gap 44B at a time when the oil in the upper oil chamber 25A moves to the lower oil chamber 25B from the annular gap 44B of the check valve 44 which is seated on the upper taper portion 42A of the piston 40, and the passage resistance generated at a time when the oil in the upper oil chamber 25A goes out of the orifice 45 of the hollow pipe 22 so as to move to the lower oil chamber 25B via the oil reservoir chamber 27 and the volumetric capacity compensating flow path 50 of the hollow pipe 22.

Further, in this extension stroke, the oil at the cross sectional area×stroke of the inner tube 12 is replenished to the lower oil chamber 25B from the oil reservoir chamber 27.

Further, in this extension stroke, the oil in the annular gap chamber 60 between the outer tube 11 and the inner tube 12, which is contracted by the rising of the inner tube 12 is discharged to the oil chamber 25 from the hole 61 in the inner tube 12 and the hole 62 in the piston 40.

Therefore, in accordance with the front fork 10 of the present embodiment, the following operations and effects are obtained.

(a) In the front fork 10, the throttle flow path 70 is provided between the hole 61 which is provided in the inner tube 12 and is communicated with the annular gap chamber 60, and the lower oil chamber 25B in the outer periphery of the hollow pipe 22. In accordance with this, the lower oil chamber 25B and the annular gap chamber 60 are separated by the throttle flow path 70. In other words, it is possible to inhibit the pressure of the lower oil chamber 25B from being applied to the annular gap chamber 60 even if the pressure in the lower oil chamber 25B rises in the compression stroke, on the basis of the existence of the throttle flow path 70. Accordingly, it is possible to avoid compression of the air staying in the annular gap chamber 60 in the compression stroke so as to generate a stable compression side damping force, and a response delay is not generated in the generation of the compression side damping force.

Further, even in the case that the compression side damping force mentioned above is set high, the throttle flow path 70 inhibits the high pressure in the lower oil chamber 25B from being applied to the seal member (the oil seal 15) in the annular gap chamber 60. In accordance with this, it is possible to prevent an oil leakage without raising pressure resistance of the seal member (the oil seal 15), and it is possible to improve sealing performance for the annular gap chamber 60.

(b) It is possible to allow the inflow of the oil to the upper oil chamber 25A in the compression stroke, by the check valve 44 provided between the hole 61 which is provided in the inner tube 12 and is communicated with the annular gap chamber 60, and the upper oil chamber 25A in the outer periphery of the hollow pipe 22. It is possible to narrow down the oil which flows out of the upper oil chamber 25A in the extension stroke.

(c) On the basis of the provision of the check valve 44 in the item (b) mentioned above in the piston 40, it is possible to achieve a simplification and a downsizing of the structure.

(d) On the basis of the provision of the throttle flow path 70 in the item (a) mentioned above in the piston 40, it is possible to achieve a simplification and a downsizing of the structure.

(e) The outer periphery of the partition wall portion 22A provided in the hollow pipe 22 is provided with the check valve 24 which allows the inflow of the oil from the oil reservoir chamber 27 in the upper portion of the partition wall portion 22A to the oil chamber 25 in the outer periphery of the hollow pipe 22 in the compression stroke, and inhibits the outflow of the oil from the oil chamber 25 in the outer periphery of the hollow pipe 22 to the oil reservoir chamber 27 in the upper portion of the partition wall portion 22A in the extension stroke. In accordance with this, it is possible to promote the oil supply to the upper oil chamber 25A from the oil reservoir chamber 27 in the upper portion so as to prevent the upper oil chamber 25A from coming to the negative pressure, in the compression stroke, and it is possible to prevent the pause of the extension side damping force from being generated at a time of inverting to the extension stroke.

(f) The volumetric capacity compensating flow path 50 for compensating the oil at the volumetric capacity at which the inner tube 12 goes into and out of the oil chamber 25 in the outer periphery of the hollow pipe 22 is formed in the hollow pipe 22. The annular check valve 53 which is attached to the outer periphery of the hollow pipe 22 is provided in the volumetric capacity compensating flow path 50. Further, the annular check valve 53 forms the annular flow path 53A which allows the oil at the going-out volume of the inner tube 12 to be replenished to the oil chamber 25 from the oil reservoir chamber 27 via the volumetric capacity compensating flow path 50 in the extension stroke, and narrows down the oil at the inserting volume of the inner tube 12 discharged to the oil reservoir chamber 27 from the oil chamber 25 via the volumetric capacity compensating flow path 50 in the compression stroke, with respect to the outer periphery of the hollow pipe 22.

The annular flow path 53A of the annular check valve 53 applies the damping characteristic of the direct proportional characteristic (the viscous resistance type) to the oil which is discharged to the oil reservoir chamber 27 from the lower oil chamber 25B via the volumetric capacity compensating flow path 50, in the compression stroke. If the flow path which is discharged to the oil reservoir chamber 27 from the lower oil chamber 25B via the volumetric capacity compensating flow path 50 is constructed by a round hole which is pierced in the hollow pipe 22, the damping characteristic comes to the square hole characteristic.

In the extension stroke, it is possible to promote the oil supply to the lower oil chamber 25B from the oil reservoir chamber 27 so as to prevent the lower oil chamber 25B from coming to the negative pressure, and it is possible to prevent the pause of the compression side damping force from being generated at a time of inverting to the compression stroke.

(g) On the basis of the provision of the compression side damping force adjusting means 90 in the flow path which discharges the oil at the volumetric capacity at which the inner tube 12 goes into the oil chamber 25 in the outer periphery of the hollow pipe 22 from the oil chamber 25 to the oil reservoir chamber 27, it is possible to finely adjust the compression side damping force.

Embodiment 2

FIG. 9 and FIG. 10

Figure 9:
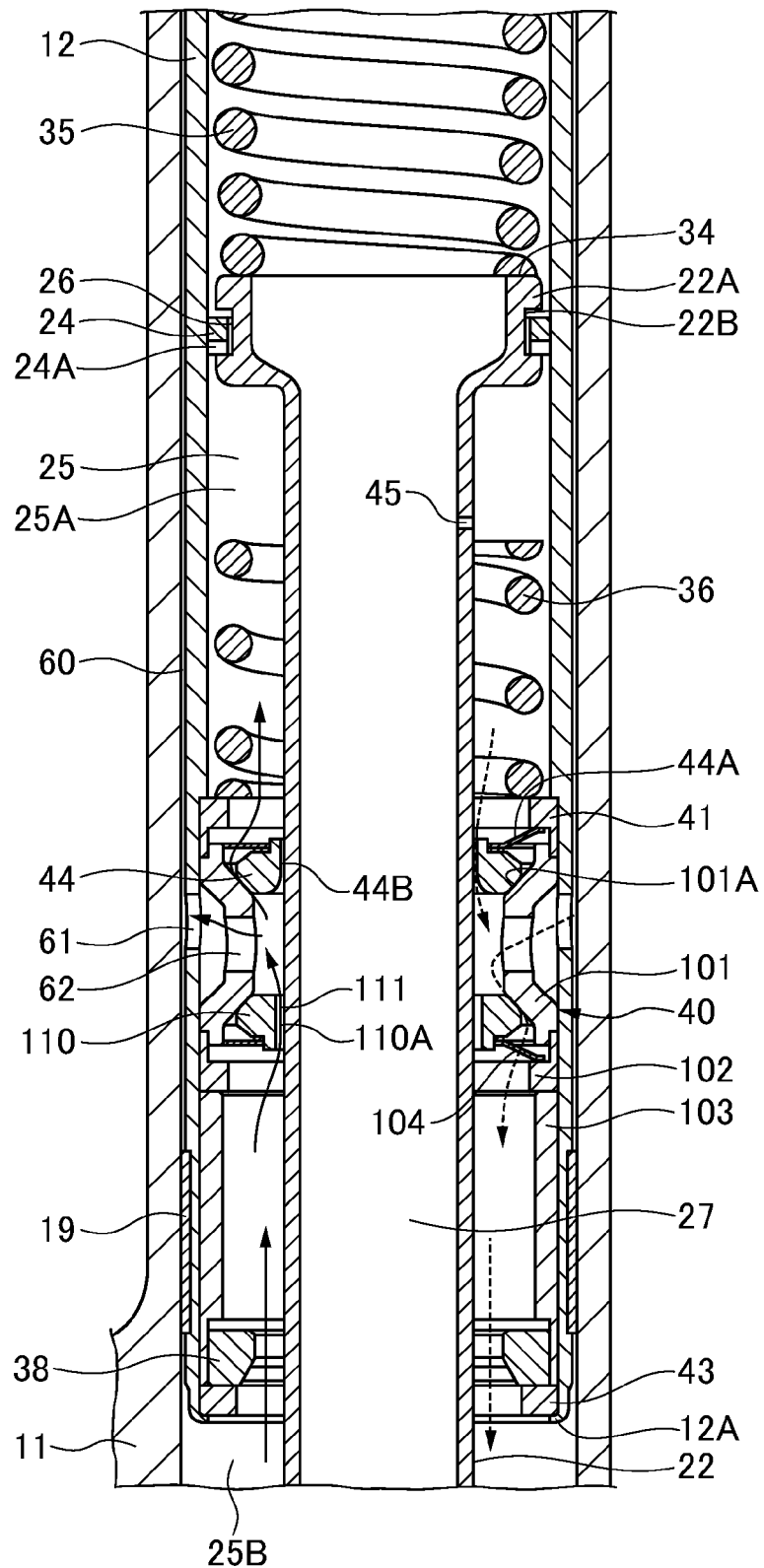
FIG. 9 is a cross sectional view of a substantial part and shows a front fork in accordance with an embodiment 2.
Figure 10:
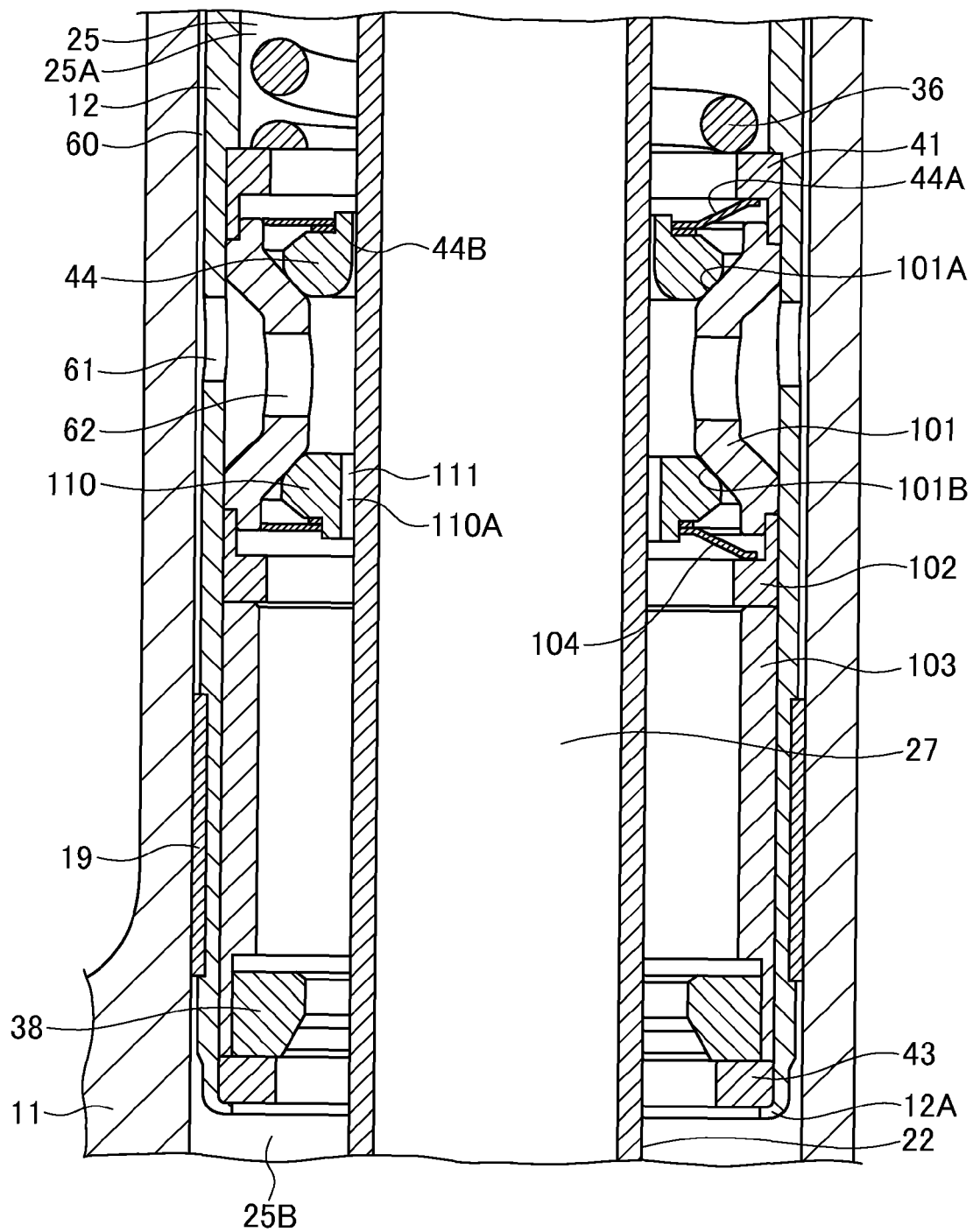
FIG. 10 is an enlarged cross sectional view showing a piston.

A different point of an embodiment 2 from the embodiment 1 exists in a structure in which a check valve 110 which allows an inflow of the oil to the lower oil chamber 25B in an extension stroke (a broken line in FIG. 9) and narrows down the oil flowing out of the lower oil chamber 25B in a compression stroke (a solid line in FIG. 9) is provided between the hole 61 of the inner tube 12 which is communicated with the annular gap chamber 60, and the hole 62 of the lower piece 42 of the piston 40, and the lower oil chamber 25B in the outer periphery of the hollow pipe 22, and a throttle flow path 111 substituting for the throttle flow path 70 mentioned above is formed by the check valve 110.

The check valve 110 consists of the same structure as the check valve 44 which is provided closer to the upper oil chamber 25A than the hole 62 communicating with the annular gap chamber 60 of the piston 40. In this case, in the embodiment 2, the lower piece 42 provided between the upper piece 41 of the piston 40. The washer 43 consists of a piston body 101, a valve stopper 102 and a spacer 103. The same oil lock collar 38 as that in the embodiment 1 is fitted and inserted between the spacer 103 and the washer 43. The check valve 44 in the embodiment 1 is arranged in an inner periphery of an upper taper portion 101A of the piston body 101 of the piston 40, and the check valve 110 is arranged in an inner periphery of a lower taper portion 101B of the piston body 101. In this case, the piston body 101 is provided with the hole 62 which is provided in the lower piece 42 in the embodiment 1.

The check valve 110 is arranged in an inner periphery of the lower taper portion 101B of the piston body 101 of the piston 40. The check valve 110 is energized by a spring 104 which is formed as a disc spring (may be formed as a coil) and is supported at its back face by the valve stopper 102 of the piston 40. The check valve 110 is structured such that a taper surface thereof is seated on a taper surface of the lower taper portion 101B of the piston body 101. An annular gap 110A is formed between an inner periphery thereof and an outer periphery of the hollow pipe 22. The check valve 110 is structured such as to form a throttle flow path 111 having a fixed opening degree by the annular gap 110A. In accordance with this, the check valve 110 is opened on the basis of a hydraulic pressure of the upper oil chamber 25A which comes to a high pressure in the extension stroke, and allows the inflow of the oil to the lower oil chamber 25B from the upper oil chamber 25A. In the compression stroke, it comes into close contact with the lower taper portion 101B of the piston body 101 on the basis of the hydraulic pressure of the low oil chamber 25B coming to a high pressure, and narrows down the oil flowing out of the lower oil chamber 25B by the annular gap 110A (the throttle flow path 111).

In accordance with the present embodiment, the following operations and effects are obtained.

(a) The throttle flow path 70 in the embodiment 1 mentioned above has the following disadvantages in the case that it not only narrows down the oil flowing out of the lower oil chamber 25B in the compression stroke, but also narrows down the oil which is going to flow into the lower oil chamber 25B. In other words, since the throttle flow path 70 mentioned above suppresses the movement of the pressurized oil in the upper oil chamber 25A to the lower oil chamber 25B in the extension stroke, the oil pressurized in the upper oil chamber 25A applies to the annular gap chamber 60 from the hole 61 of the inner tube 12, and compresses the air which stays in the annular gap chamber 60. In accordance with this, it is impossible to generate a stable extension side damping force, and a response delay is generated in the generation of the damping force. Further, in the case that the extension side damping force mentioned above is set high, the high pressure of the upper oil chamber 25A is directly applied to the seal member (the oil seal 15) of the annular gap chamber 60, and there is a risk that oil leakage is induced. Therefore, it is necessary to increase the pressure resistance of the seal member (the oil seal 15). An upper limit of the extension side damping force is decided by the pressure resistance of the seal member (the oil seal 15).

On the contrary, the check valve 110 which allows the inflow of the oil to the lower oil chamber 25B in the extension stroke, and narrows down the oil flowing out of the lower oil chamber 25B in the compression stroke, is provided between the hole 61 which is provided in the inner tube 12 and is communicated with the annular gap chamber 60, and the lower oil chamber 25B in the outer periphery of the hollow pipe 22. The throttle flow path 111 substituting for the throttle flow path 70 mentioned above is formed by the check valve 110. In accordance with this, the throttle flow path 111 of the check valve 110 serves as the throttle flow path 70 mentioned above in the compression stroke, thereby improving the response of the compression side damping force as mentioned above. Even in the case that the compression side damping force is set high, it is possible to improve the sealing performance of the annular gap chamber 60.

Further, since it is possible to allow the pressurized oil in the upper oil chamber 25A to immediately flow to the lower oil chamber 25B in the extension stroke, by this check valve 110, the oil pressurized in the upper oil chamber 25A does not apply to the annular gap chamber 60 from the hole 61 of the inner tube 12 and does not compress the air which stays in the annular gap chamber 60. In accordance with this, it is possible to improve the response as well as stabilizing the generation of the extension side damping force. Further, since the high pressure in the upper oil chamber 25A does not apply to the seal member (the oil seal 15) in the annular gap chamber 60, the upper limit of the extension side damping force is not decided by the pressure resistance of the seal member (the oil seal 15), and it is possible to improve the sealing performance of the annular gap chamber 60.

(b) Since the throttle flow path 111 of the check valve 110 in the item (a) mentioned above consists of the throttle flow path 111 having the fixed opening degree, it is possible to simplify the check valve 110.

(c) Since the check valve 110 in the items (a) and (b) mentioned above is provided in the piston 40, it is possible to achieve the simplification and the downsizing of the structure.

Embodiment 3

Figure 11:
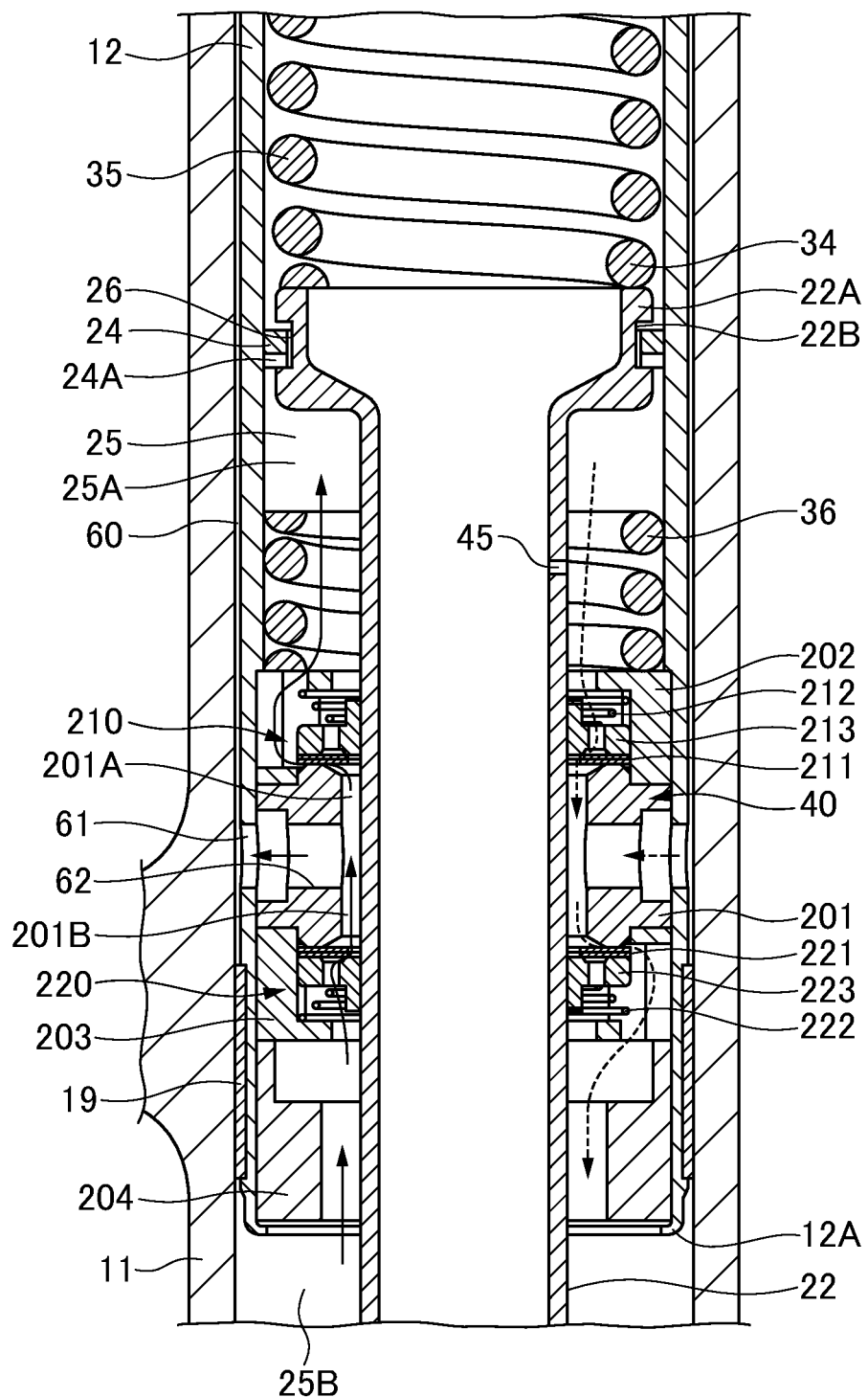
FIG. 11 is a cross sectional view of a substantial part and shows a front fork in accordance with an embodiment 3.
Figure 12:
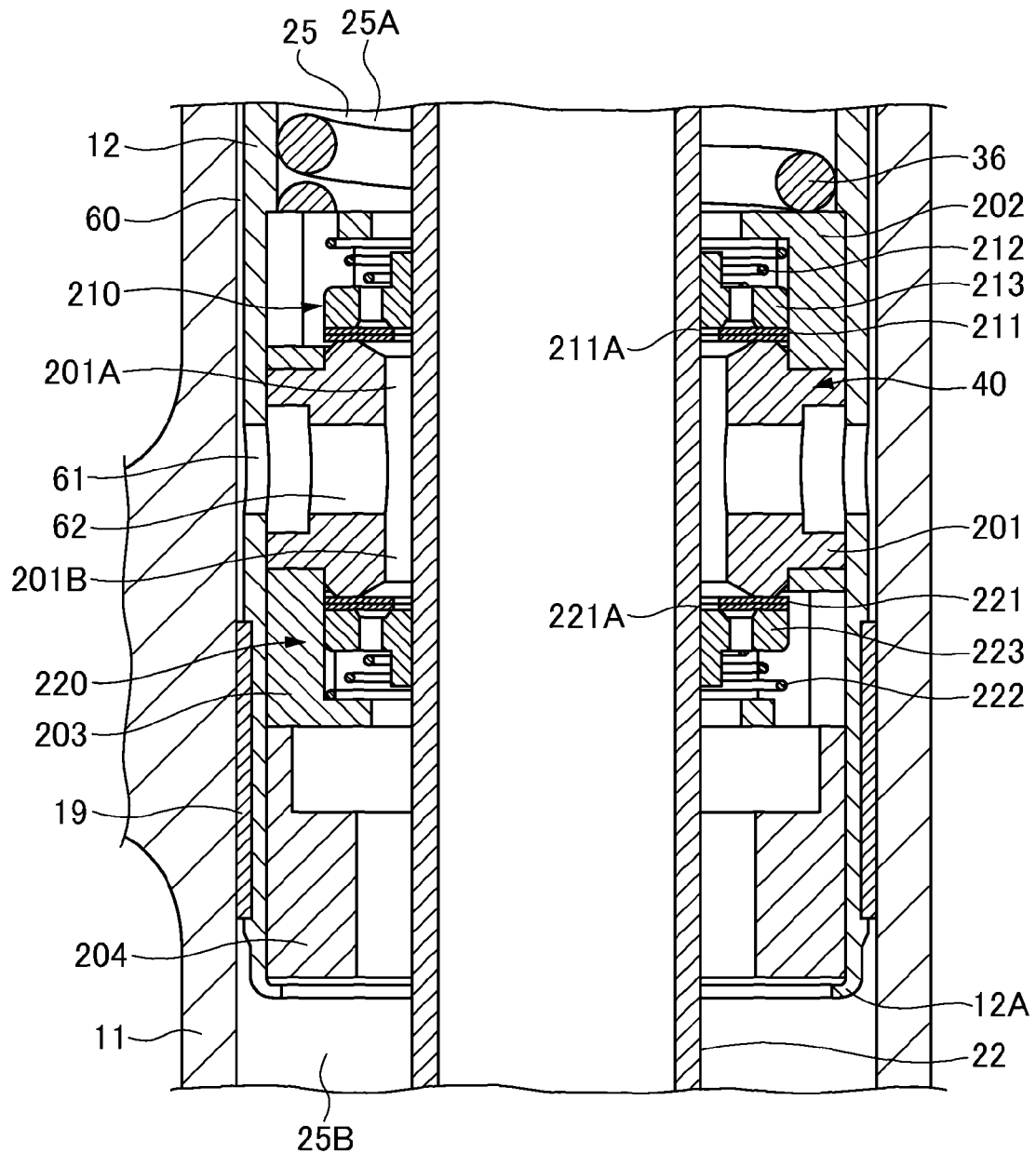
FIG. 12 is an enlarged cross sectional view showing a piston.

FIG. 11 and FIG. 12

A different point of an embodiment 3 from the embodiment 2 exists in a structure in which the check valve 44 and the check valve 110 provided in the piston 40 are changed to a check valve 210 and a check valve 220 which consist of disc valves 211 and 221.

In the embodiment 3, the piston 40 in accordance with the embodiment 2 which is caulked and fixed to the leading end portion of the inner tube 12 consists of a piston body 201, upper and lower valve stoppers 202 and 203 thereof, and a spacer 204. The piston body 201 is provided with the hole 62 in accordance with the embodiment 2.

The check valve 210 is provided between the piston body 201 and the upper valve stopper 202, and consists of a disc valve 211 which opens and closes a flow path 201A communicating with the hole 62 of the piston body 201, a valve spring 212 which energizes the disc valve 211 in a close side, and a valve piece 213. In accordance with this, the check valve 210 lifts up the disc valve 211 on the basis of a hydraulic pressure of the lower oil chamber 25B coming to the high pressure so as to be opened in a compression stroke (a solid line in FIG. 11), thereby allowing an inflow of the oil from the lower oil chamber 25B to the upper oil chamber 25A. On the other hand, the check valve 210 flexibly deforms the disc 211 on the basis of the hydraulic pressure in the upper oil chamber 25A coming to the high pressure so as to open the gap coming to a throttle flow path 211A in a extension stroke (a broken line in FIG. 11), thereby narrowing down the oil flowing out of the upper oil chamber 25A by the throttle flow path 211A.

The check valve 220 is provided between the piston body 201 and the lower valve stopper 203, and consists of a disc valve 221 which opens and closes a flow path 201B communicating with the hole 62 of the piston body 201, a valve spring 222 which energizes the disc valve 221 in a close side, and a valve piece 223. In accordance with this, the check valve 220 lifts up the disc valve 221 on the basis of a hydraulic pressure of the upper oil chamber 25A coming to the high pressure so as to be opened in the expression stroke, thereby allowing an inflow of the oil from the upper oil chamber 25A to the lower oil chamber 25B. In the compression stroke, it flexibly deforms the disc valve 221 on the basis of the hydraulic pressure in the lower oil chamber 25B coming to the high pressure so as to open the gap coming to the throttle flow path 221A, thereby narrowing down the oil flowing out of the lower oil chamber 25B by the throttle flow path 221A.

In accordance with the present embodiment, as well as achieving the operations and effects which are substantially the same as the items (a) and (c) mentioned above in the embodiment 2, the following operation and effect are obtained.

The throttle flow path 221A of the check valve 220 consists of the throttle flow path 221A which changes the opening degree by opening and closing the disc valve 221. In accordance with this, a setting and adjusting width of the compression side damping force characteristic in the compression stroke becomes larger.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

In accordance with the present invention, there is provided a front fork comprising: an inner tube in a vehicle body side being slidably inserted into an outer tube in a wheel side. A hollow pipe has a partition wall portion coming into slidable contact with an inner periphery of the inner tube being provided in a rising manner in a bottom portion within the outer tube. An oil chamber in which a piston provided in an inner periphery of a leading end portion of the inner tube moves back and forth is provided in an outer periphery of the hollow pipe, and the oil chamber being comparted into an upper oil chamber above the piston and a lower oil chamber below the piston by the piston. An oil reservoir chamber runs into an upper portion of the inner tube being defined in an inner periphery of the hollow pipe, and an upper portion of the oil reservoir chamber being formed as an air chamber. The oil chamber in the outer periphery of the hollow pipe is communicated with the oil reservoir chamber in the inner periphery of the hollow pipe. The hollow pipe is provided with a volumetric capacity compensating flow path for compensating an oil at a volumetric capacity at which the inner tube goes into and out of the oil chamber in the outer periphery of the hollow pipe. An annular gap chamber sandwiched by a slide guide is fixed to an inner periphery of the outer tube and a slide guide fixed to an outer periphery of the inner tube. The annular gap chamber is provided between the outer tube and the inner tube, and the inner tube is provided with a hole which communicates the annular gap chamber with the oil chamber in the outer periphery of the hollow pipe. A throttle flow path is provided between a hole which is provided in the inner tube and is communicated with the annular gap chamber, and a lower oil chamber in the outer periphery of the hollow pipe. Accordingly, it is possible to improve a response of generation of a damping force, and improve a sealing performance of an annular gap chamber between an outer tube and an inner tube, in a front fork.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A front fork comprising:
    an inner tube in a vehicle body side being slidably inserted into an outer tube in a wheel side;
    a hollow pipe having a partition wall portion coming into slidable contact with an inner periphery of the inner tube being provided in a rising manner in a bottom portion within the outer tube;
    an oil chamber in which a piston provided in an inner periphery of a leading end portion of the inner tube moves back and forth being provided in an outer periphery of the hollow pipe, and the oil chamber being comparted into an upper oil chamber above the piston and a lower oil chamber below the piston by the piston;
    an oil reservoir chamber running into an upper portion of the inner tube being defined in an inner periphery of the hollow pipe, and an upper portion of the oil reservoir chamber being formed as an air chamber;
    a volumetric capacity compensating flow path provided in the hollow pipe to communicate the oil chamber in the outer periphery of the hollow pipe with the oil reservoir chamber in the inner periphery of the hollow pipe for compensating an oil at a volumetric capacity at which the inner tube goes into and out of the oil chamber in the outer periphery of the hollow pipe; and an annular gap chamber sandwiched by a slide guide fixed to an inner periphery of the outer tube and a slide guide fixed to an outer periphery of the inner tube, the annular gap chamber being provided between the outer tube and the inner tube, and the inner tube being provided with at least one hole which communicates the annular gap chamber with the oil chamber in the outer periphery of the hollow pipe, wherein a throttle flow path is provided between the hole which is provided in the inner tube and is communicated with the annular gap chamber, and the lower oil chamber in the outer periphery of the hollow pipe.

2. The front fork according to claim 1, wherein a check valve which allows an inflow of the oil to the upper oil chamber in a compression stroke and narrows down the oil flowing out of the upper oil chamber in an extension stroke is provided between the hole which is provided in the inner tube and is communicated with the annular gap chamber, and the upper oil chamber in the outer periphery of the hollow pipe.

3. The front fork according to claim 2, wherein the check valve is provided in the piston.

4. The front fork according to claim 3, wherein the throttle flow path is provided in the piston.

5. The front fork according to claim 2, wherein the throttle flow path is provided in the piston.

6. The front fork according to claim 2, wherein an outer periphery of the partition wall portion provided in the hollow pipe is provided with a check valve which allows an inflow of the oil from the oil reservoir chamber above the partition wall portion to the oil chamber in the outer periphery of the hollow pipe in the compression stroke, and inhibits an outflow of the oil from the oil chamber in the outer periphery of the hollow pipe to the oil reservoir chamber above the partition wall portion in the extension stroke.

7. The front fork according to claim 2, wherein a volumetric capacity compensating flow path for compensating the oil at a volumetric capacity in which the inner tube goes into and out of the oil chamber in the outer periphery of the hollow pipe is formed in the hollow pipe, wherein the volumetric capacity compensating flow path is provided with an annular check valve which is attached to the outer periphery of the hollow pipe, and an annular flow path is formed between the annular check valve and the outer periphery of the hollow pipe, allowing the oil at a going-out volume of the inner tube to be replenished to the oil chamber from the oil reservoir chamber via the volumetric capacity compensating flow path in the extension stroke, and narrows down the oil at an inserting volume of the inner tube discharged to the oil reservoir chamber from the oil chamber via the volumetric capacity compensating flow path in the compression stroke.

8. The front fork according to claim 2, wherein a compression side damping force adjusting means is provided in the flow path which discharges the oil at the volumetric capacity at which the inner tube goes into the oil chamber in the outer periphery of the hollow pipe in the compression stroke from the oil chamber to the oil reservoir chamber.

9. The front fork according to claim 1, wherein a check valve which allows an inflow of the oil to the lower oil chamber in an extension stroke and narrows down the oil flowing out of the lower oil chamber in a compression stroke is provided between the hole which is provided in the inner tube and is communicated with the annular gap chamber, and the lower oil chamber in the outer periphery of the hollow pipe, and the check valve forms the throttle flow path.

10. The front fork according to claim 9, wherein the throttle flow path of the check valve is constructed by a throttle flow path having a fixed opening degree.

11. The front fork according to claim 10, wherein the check valve is provided in the piston.

12. The front fork according to claim 9, wherein the throttle flow path of the check valve is constructed by a throttle flow path in which an opening degree is changed by opening and closing a disc valve.

13. The front fork according to claim 12, wherein the check valve is provided in the piston.

14. The front fork according to claim 9, wherein the check valve is provided in the piston.

15. The front fork according to claim 1, wherein a volumetric capacity compensating flow path for compensating the oil at a volumetric capacity in which the inner tube goes into and out of the oil chamber in the outer periphery of the hollow pipe is formed in the hollow pipe, wherein the volumetric capacity compensating flow path is provided with an annular check valve which is attached to the outer periphery of the hollow pipe, and an annular flow path is formed between the annular check valve and the outer periphery of the hollow pipe, allowing the oil at a going-out volume of the inner tube to be replenished to the oil chamber from the oil reservoir chamber via the volumetric capacity compensating flow path in the extension stroke, and narrows down the oil at an inserting volume of the inner tube discharged to the oil reservoir chamber from the oil chamber via the volumetric capacity compensating flow path in the compression stroke.

16. The front fork according to claim 1, wherein an outer periphery of the partition wall portion provided in the hollow pipe is provided with a check valve which allows an inflow of the oil from the oil reservoir chamber above the partition wall portion to the oil chamber in the outer periphery of the hollow pipe in the compression stroke, and inhibits an outflow of the oil from the oil chamber in the outer periphery of the hollow pipe to the oil reservoir chamber above the partition wall portion in the extension stroke.

17. The front fork according to claim 1, wherein a compression side damping force adjusting means is provided in the flow path which discharges the oil at the volumetric capacity at which the inner tube goes into the oil chamber in the outer periphery of the hollow pipe in the compression stroke from the oil chamber to the oil reservoir chamber.

18. The front fork according to claim 1, wherein the throttle flow path is provided in the piston.

* * * * *